US011888363B2

(12) United States Patent
Bledsoe

(10) Patent No.: US 11,888,363 B2
(45) Date of Patent: Jan. 30, 2024

(54) BUSBAR FIXTURE TOOL FOR HOLDING A STATOR DURING ASSEMBLY

(71) Applicant: BorgWarner Inc., Auburn Hills, MI (US)

(72) Inventor: Christopher A. Bledsoe, Anderson, IN (US)

(73) Assignee: BORGWARNER INC., Auburn Hills, MI (US)

( * ) Notice: Subject to any disclaimer, the term of this patent is extended or adjusted under 35 U.S.C. 154(b) by 383 days.

(21) Appl. No.: 17/123,709

(22) Filed: Dec. 16, 2020

(65) Prior Publication Data
US 2022/0190698 A1 Jun. 16, 2022

(51) Int. Cl.
*H02K 15/12* (2006.01)
*H02K 15/085* (2006.01)
*H02K 15/00* (2006.01)

(52) U.S. Cl.
CPC ....... *H02K 15/085* (2013.01); *H02K 15/0068* (2013.01); *H02K 15/12* (2013.01); *H02K 2203/09* (2013.01)

(58) Field of Classification Search
CPC .. H02K 15/0068; H02K 15/12; H02K 15/085; H02K 1/276; H02K 15/125; H02K 11/21; H02K 11/30; H02K 15/03; H02K 7/06; H02K 1/28; H02K 11/20; B29C 45/7653; B29C 45/03; B29C 45/14467; B29C 43/18; B29C 45/80; F16H 25/20
See application file for complete search history.

(56) References Cited

U.S. PATENT DOCUMENTS

| | | | | |
|---|---|---|---|---|
| 10,622,861 | B2* | 4/2020 | Hashimoto | H02K 3/28 |
| 2017/0373563 | A1* | 12/2017 | Kim | H02K 7/1166 |
| 2021/0143699 | A1* | 5/2021 | Alsman | H02K 3/50 |
| 2021/0359567 | A1* | 11/2021 | Neet | H02K 3/50 |

FOREIGN PATENT DOCUMENTS

JP 2015033293 A * 2/2015

OTHER PUBLICATIONS

JP-2015033293-A machine translation Aug. 5, 2023.*

* cited by examiner

*Primary Examiner* — Christopher M Koehler
*Assistant Examiner* — Leda T Pham
(74) *Attorney, Agent, or Firm* — CANTOR COLBURN LLP

(57) ABSTRACT

A fixture for holding a stator including a stator core having a plurality of stator windings during assembly. The fixture includes a first fixture portion including a base defining a first stator receiving portion that is receptive of a first end of the stator, a second fixture portion including second stator receiving portion that is receptive of a second end of the stator, and at least one alignment feature provided on one of the first fixture portion and the second fixture portion. The at least one alignment feature is configured to establish a selected alignment between a terminal end of each of the plurality of stator windings and busbar.

18 Claims, 3 Drawing Sheets

BUSBAR FIXTURE TOOL FOR HOLDING A STATOR DURING ASSEMBLY

BACKGROUND OF THE INVENTION

Exemplary embodiments pertain to the art of electric machines and, more particularly, to a bus bar fixture tool for holding a stator during assembly.

Electric machines typically include stators that include a stator core that supports a plurality of stator windings. A bus bar provides an interface between the plurality of electrical windings and an external connection. After building the stator core and applying the plurality of stator windings, the stator may be heated and then inserted into a housing. As the stator cools, a bond is formed with the housing. The bus bar may be welded to the stator core before the stator is mounted in the housing.

Ensuring a proper alignment between the busbar and the stator core is desirable. That is, the busbar should be properly oriented on the stator core to ensure a proper interface with the stator housing. Further, it is desirable to maintain or establish a particular stack height for the stator core with the busbar. The stack height ensures a proper fit in the stator housing. Adjusting stack height after insertion into the housing is a difficult process. Accordingly, the industry would welcome a system for aligning a busbar to a stator core and establishing a selected stator core stack height before mounting in a stator housing.

BRIEF DESCRIPTION OF THE INVENTION

Disclosed is a fixture for holding a stator including a stator core having a plurality of stator windings during assembly. The fixture includes a first fixture portion including a base defining a first stator receiving portion that is receptive of a first end of the stator, a second fixture portion including second stator receiving portion that is receptive of a second end of the stator, and at least one alignment feature provided on one of the first fixture portion and the second fixture portion. The at least one alignment feature is configured to establish a selected alignment between a terminal end of select ones of the plurality of stator windings and busbar.

Also disclosed is a stator assembly including a stator fixture including a first fixture portion having a base defining a first stator receiving portion, a second fixture portion including a second stator receiving portion, and a stator including a stator core having a first axial end, a second axial end, and a plurality of stator windings including a first end turn that projects from the first axial end and a second end turn that projects from the second axial end. The first end turn is positioned in the first stator receiving portion and the second end turn is positioned in the second stator receiving portion. A busbar is arranged between the second axial end of the stator core and the second fixture portion. At least one alignment feature is provided on one of the first fixture portion and the second fixture portion. The at least one alignment feature is configured to establish a selected alignment between a terminal end of the plurality of stator windings and the busbar.

Still further disclosed is a method of assembling a stator including arranging a first end of a stator at a stator receiving portion of a first fixture portion, positioning a busbar at a second, opposing end of the stator, placing a second fixture portion on the second, opposing end of the stator, aligning the busbar with terminal end portions of a plurality of stator windings at the second, opposing end of the stator with at least one alignment feature, and securing the terminal end portions of the plurality of stator windings to the busbar through the second fixture portion.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

A detailed description of one or more embodiments of the disclosed apparatus and method are presented herein by way of exemplification and not limitation with reference to the Figures.

Figure 1:
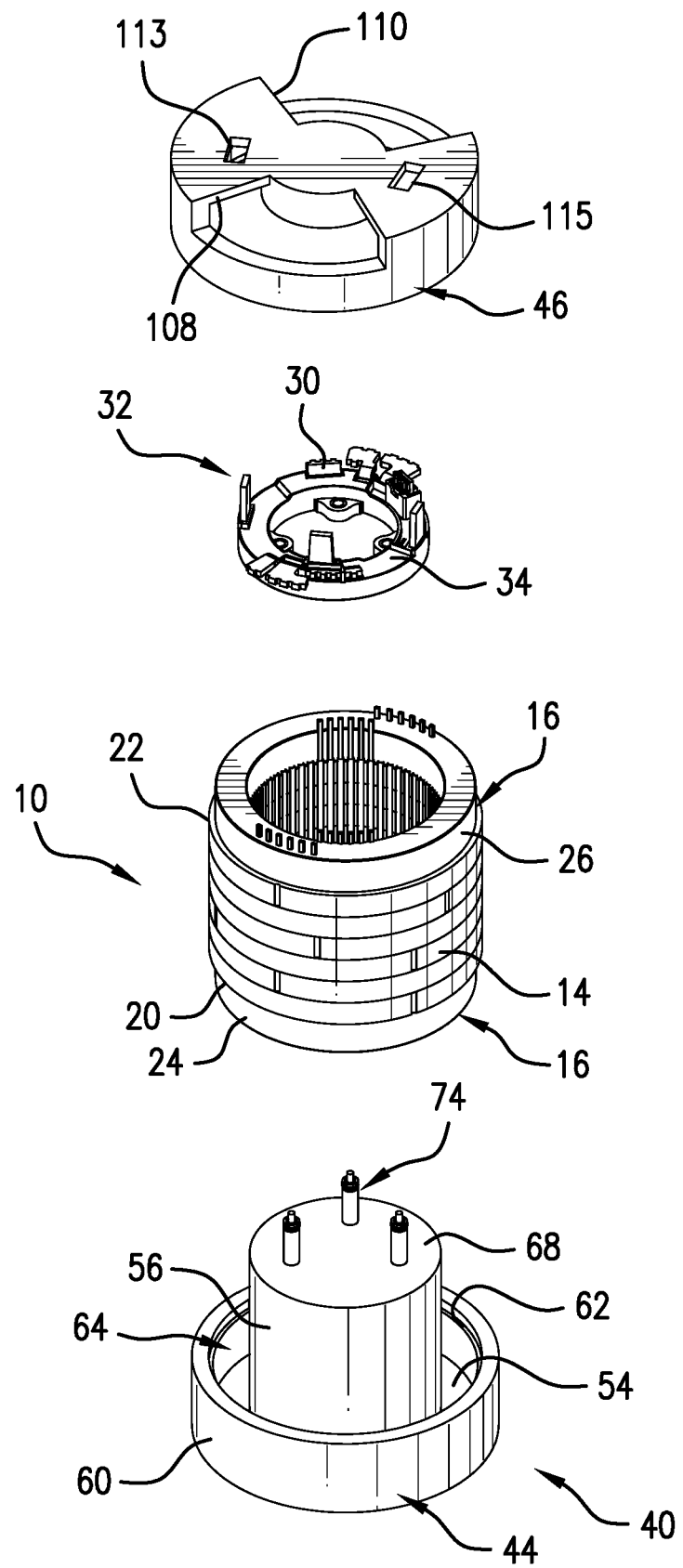
FIG. 1 depicts a disassembled view of the busbar fixture tool and stator, in accordance with an exemplary aspect.

With initial reference to FIG. 1 a stator is indicated generally at 10. Stator 10 includes a stator core 14 that supports a plurality of stator windings 16. Stator core 14 includes a first axial end 20 and a second, opposing axial end 22. Plurality of stator windings 16 includes a first end turn 24 positioned axially outwardly of first axial end 20 and a second end turn 26 positioned axially outwardly of second axial end 22.

Figure 2:
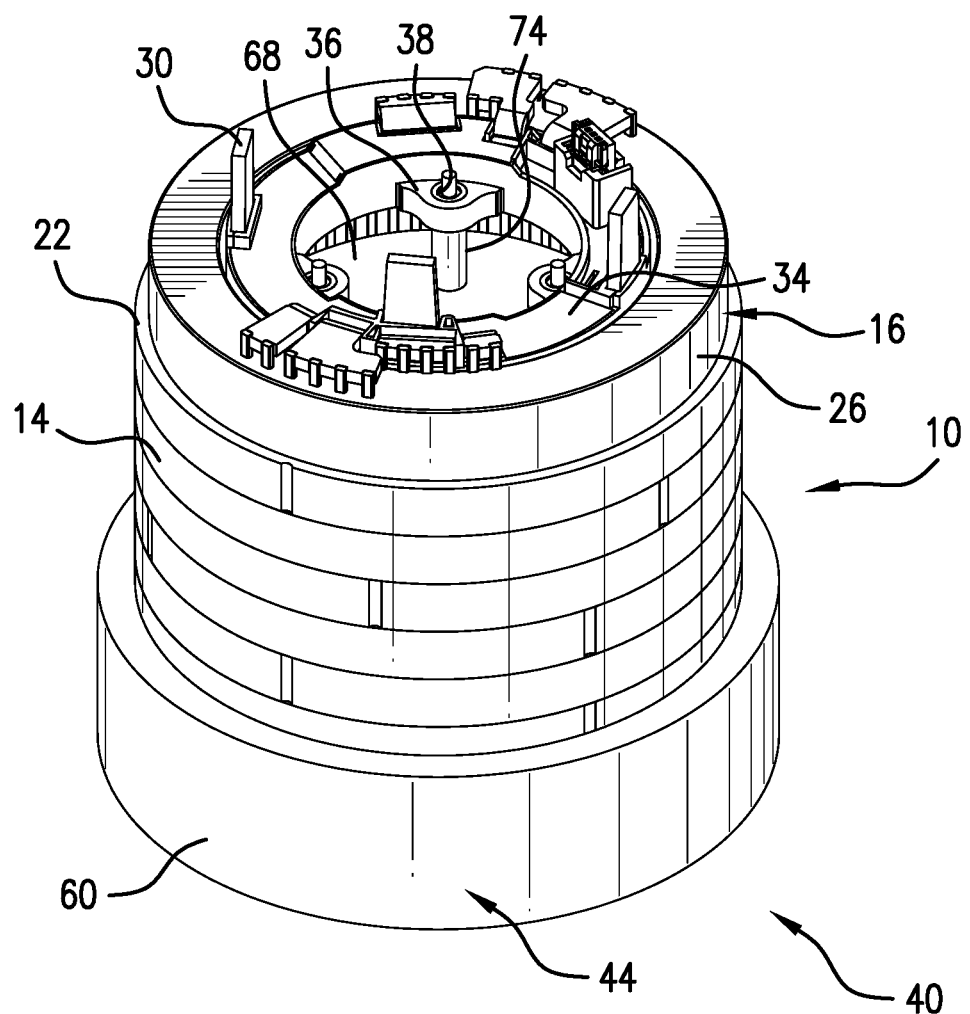
FIG. 2 depicts a partial perspective view of the stator mounted in a bottom portion of the busbar fixture of FIG. 1, in accordance with an exemplary aspect.

Plurality of stator windings 16 include a first plurality of terminal ends 30 and a second plurality of terminal ends 32 that extend from second end turn 26. First plurality of terminal ends 30 are interconnected at a busbar 34 to establish a selected phase connection for the plurality of stator windings 16 and second terminal end 32 provide an external connection that either carries power from or delivers power to stator 10. In the embodiment shown, busbar 34 includes a plurality of alignment elements, one of which is indicated at 36 each having a corresponding openings 38 (FIG. 2). As will be detailed herein, alignment elements 36 are employed by a fixture 40 to establish a selected position of busbar 34 relative to stator core 14 as well as a selected stack height for stator 10.

Fixture 40 includes a first fixture portion 44 that receives first end turn 24 and a second fixture portion 46 that receive second end turn 26. First fixture portion 44 includes a base 54 and a central projection 56. Central projection 56 extends axially outwardly from base 54. An annular wall 60 extends around base 54 spaced from central projection 56. Annular wall 60 may include a lip 62 which supports first axial end 20 of stator core 14. First fixture portion 44 includes a first stator receiving portion 64 defined between annular wall 60 and central projection 56. At this point, it should be understood that while base 54 and annular wall 60 are shown as being substantially circular, other geometries may be employed.

Referring to FIG. 2 and with continued reference to FIG. 1, central projection 56 includes a surface 68 having a plurality of recesses, one of which is shown at 70 from which extend a plurality of alignment features 74. Alignment features 74 interact with alignment elements 36 to establish a selected orientation of busbar 34 relative to stator core 14. Alignment features also establish a selected spacing between second axial end 22 and busbar 34. That is, busbar 34 is nested within second end turn 26 and spaced from second axial end 22. The particular spacing may vary depending upon machine constraints.

In an embodiment, each recess 70 houses a biasing element 78 that urges a corresponding one of the plurality of alignment features 74 axially outwardly. In the embodiment shown biasing element 78 takes the form of a coil spring 80. However, it should be understood that biasing element 78 may take on a variety of forms including a cushion of air, hydraulic fluid or other devices that may act to outwardly bias each alignment feature 74. In an embodiment, each alignment feature 74 includes a terminal end section 85 having a shoulder 87 and a reduced diameter portion or pin 89. Each pin 89 is received in a corresponding openings 38 of each alignment element 36. As will be detailed herein, busbar 34 rests on shoulder 87 to establish a selected axial stack height.

Figure 3:
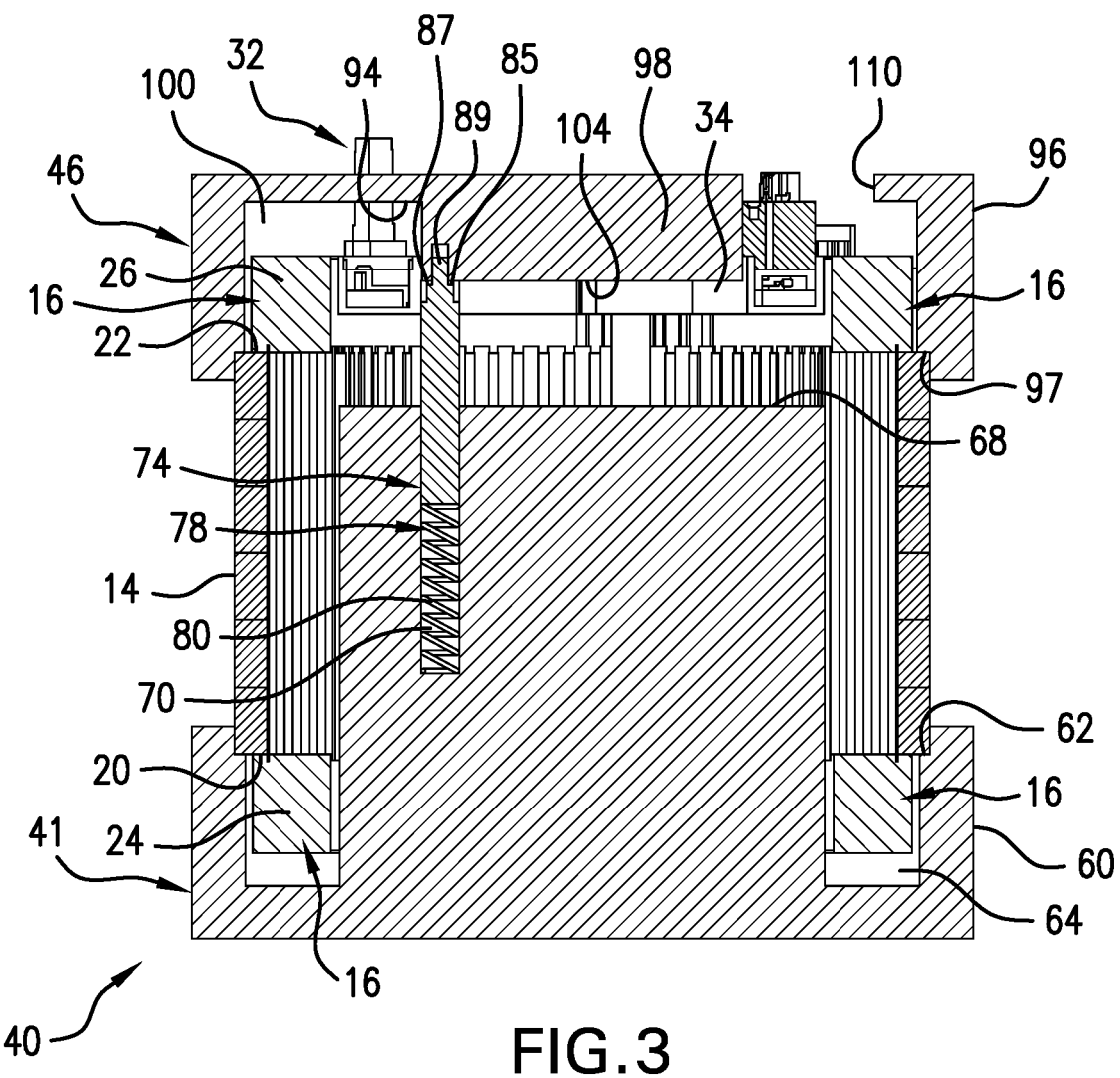
FIG. 3 depicts a partial cross-sectional view of the busbar fixture mounted to a stator; in accordance with an exemplary aspect.

With reference to FIG. 3, and continued reference to FIGS. 1 and 2, second fixture portion 46 includes a base portion 94 surrounded by an annular wall portion 96 having an internal lip 97. In a manner similar to that discussed herein, internal lip 97 engages with second axial end 22 of stator core 14. Second fixture portion 46 is also shown to include a central projection portion 98 that is spaced from annular wall portion 96 so as to define a second stator receiving portion 100. As also discussed herein, it should be understood that while base portion 94 and annular wall portion 96 are shown as being substantially circular, other geometries may be employed.

In an embodiment, central projection portion 98 includes a surface 104 which, when second fixture portion is mounted to stator 10, limits axial outward travel of busbar 34. That is, alignment features 74 urge busbar 34 axially outwardly into contact with surface 104. The depth of central projection portion 98 establishes the selected spacing between busbar 34 and second axial end 22 so as to define a stack height of stator 10. Second fixture portion 46 also includes a first access window 108 and a second access window 110. Each access window 108 and 110 extends through base portion 94 and a portion of annular wall portion 96 to provide access to busbar 34. With this arrangement, first terminal end portions 30 may be joined to busbar 34 to establish a selected wiring for stator 10. Second fixture portion 46 also includes a first opening 113 and a second opening 115 that extend through base portion 94. First and second openings 113 and 115 provide passage for second terminal end portions 32. Once assembly, stator 10 may be dropped into a housing for final assembly of an electric machine.

At this point, it should be understood that the exemplary embodiments describe a fixture that facilitates building a stator for an electric machine. The fixture not only ensures a proper orientation of a busbar relative to a stator core but also establishes a selected stack height of the stator. In this manner, the stator may be easily installed into a housing with all connections being in proper position and the stator having the selected dimensions.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. A fixture for holding a stator including a stator core having a plurality of stator windings during assembly comprising:
   a first fixture portion including a base defining a first stator receiving portion that is receptive of a first axial end of the stator, the first fixture portion including a wall projecting outwardly of the base and a projection that extends from the base and is surrounded by the wall, the wall being spaced from the projection to define the first stator receiving portion;
   a second fixture portion including second stator receiving portion that is receptive of a second axial end of the stator, the second axial end of the stator being opposite the first axial end of the stator; and
   at least one alignment feature provided on one of the first fixture portion and the second fixture portion, the at least one alignment feature being configured to establish a selected alignment between a terminal end of select ones of the plurality of stator windings and busbar.

2. The fixture according to claim 1, wherein the projection includes at least one recess, the at least one alignment feature being disposed in the at least one recess.

3. The fixture according to claim 2, further comprising: a biasing element provided in the at least one recess.

4. The fixture according to claim 3, wherein the biasing element comprises a spring.

5. The fixture according to claim 1, further comprising: at least one access window provided in the second fixture portion.

6. A stator assembly comprising:
   a stator fixture including a first fixture portion having a base defining a first stator receiving portion;
   a second fixture portion including a second stator receiving portion;
   a stator including a stator core having a first axial end, a second axial end that is opposite the first axial end, a plurality of stator windings including a first end turn that projects from the first axial end and a second end turn that projects from the second axial end, the first end turn being positioned in the first stator receiving portion and the second end turn being positioned in the second stator receiving portion;
   a busbar arranged between the second axial end of the stator core and the second fixture portion; and
   at least one alignment feature provided on one of the first fixture portion and the second fixture portion, the at least one alignment feature being configured to establish a selected alignment between a terminal end of the plurality of stator windings and the busbar.

7. The stator assembly according to claim 6, wherein the first fixture portion includes a wall projecting outwardly of the base and a projection that extends from the base and is surrounded by the wall, the wall being spaced from the projection to define the first stator receiving portion.

8. The stator assembly according to claim 7, wherein the projection includes at least one recess, the at least one alignment feature being disposed in the at least one recess.

9. The stator assembly according to claim 8, further comprising: a biasing element provided in the at least one recess.

10. The stator assembly according to claim 9, wherein the biasing element comprises a spring.

11. The stator assembly according to claim 6, wherein the busbar includes an alignment element that is receptive of the at least one alignment feature.

12. The stator assembly according to claim 11, wherein the alignment element comprises an opening and the at least one alignment feature comprises a pin that extends into the opening.

13. The stator assembly according to claim 6, further comprising: at least one access window provided in the second fixture portion.

14. A method of assembling a stator comprising:
arranging a first axial end of the stator at a first stator receiving portion of a first fixture portion by placing a stator core of the stator over a projection that extends from the first fixture portion;
positioning a busbar at a second axial end of the stator, the second axial end being opposite the first axial end;
placing a second fixture portion on the second axial end of the stator;
aligning the busbar with terminal end portions of a plurality of stator windings at the second axial end of the stator with at least one alignment feature; and
securing the terminal end portions of the plurality of stator windings to the busbar through the second fixture portion.

15. The method of claim 14, further comprising:
establishing a stack height of the stator includes biasing the busbar toward the second fixture portion by urging the at least one alignment feature outwardly of the projection.

16. The method of claim 15, wherein urging the at least one alignment feature includes forcing the at least one alignment feature outward with a spring provided in the projection.

17. The method of claim 14, wherein aligning the busbar includes positioning at least two alignment features extending from the projection in corresponding alignment elements on the busbar.

18. The method of claim 14, wherein securing the terminal end portions of the plurality of stator windings to the busbar includes welding the terminal end portions of the plurality of stator windings to the busbar through a window provided in the second fixture portion.

* * * * *